M. & M. H. ROSENHEIMER.
TIRE RETAINING MECHANISM.
APPLICATION FILED NOV. 17, 1913.
1,119,991. Patented Dec. 8, 1914.
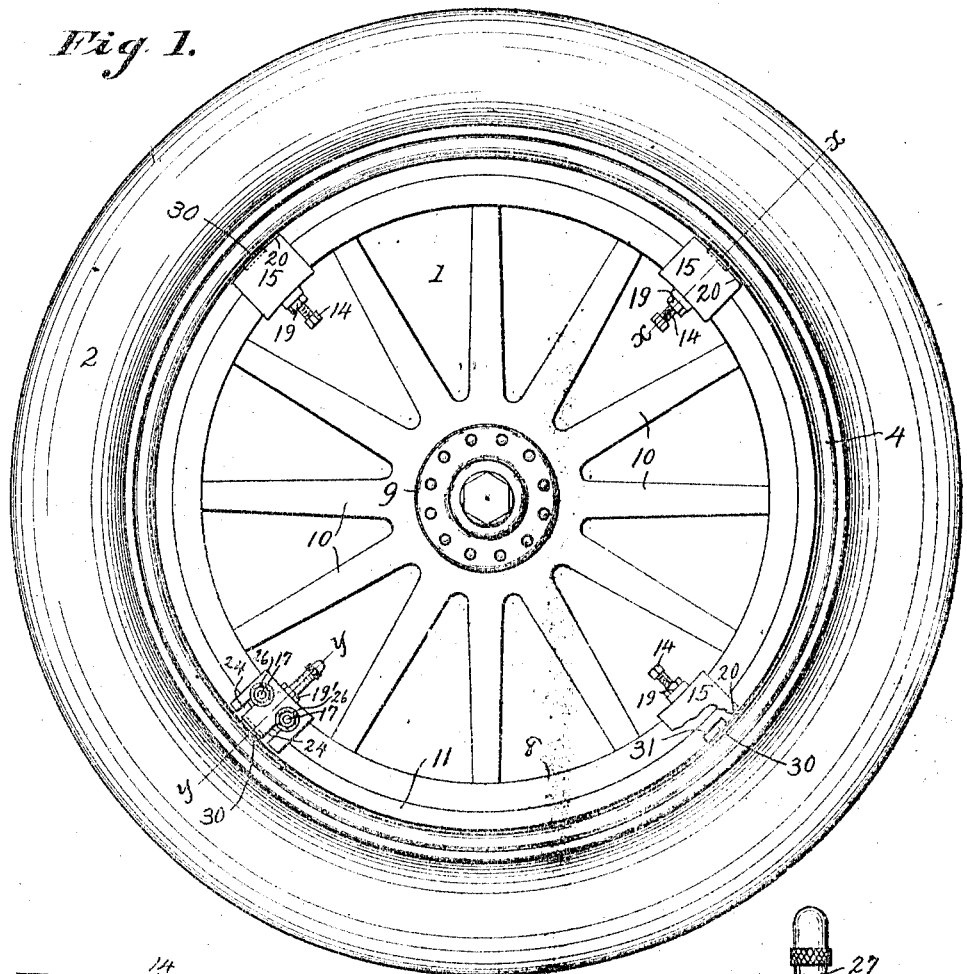
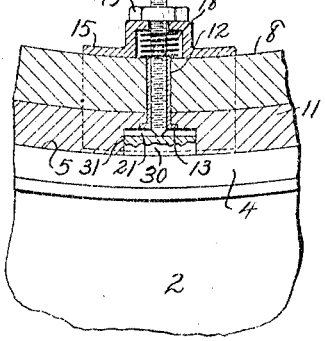
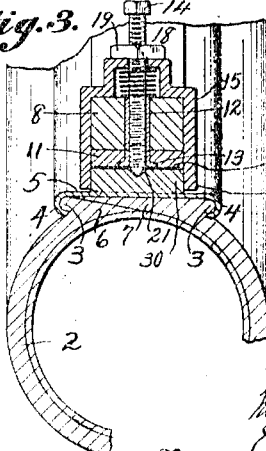
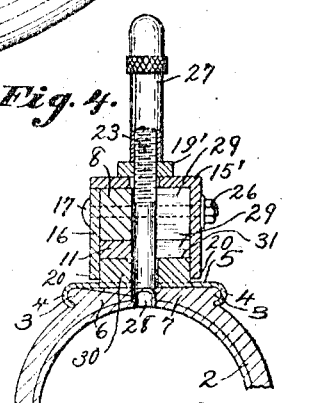

UNITED STATES PATENT OFFICE.

MEYER ROSENHEIMER AND MEYER HUGO ROSENHEIMER, OF MILWAUKEE, WISCONSIN.

TIRE-RETAINING MECHANISM.

1,119,991.

Specification of Letters Patent.

Patented Dec. 8, 1914.

Application filed November 17, 1913. Serial No. 801,363.

*To all whom it may concern:*

Be it known that we, MEYER ROSENHEIMER and MEYER HUGO ROSENHEIMER, citizens of the United States, residing at Milwaukee, county of Milwaukee, and State of Wisconsin, have invented new and useful Improvements in Tire-Retaining Mechanism, of which the following is a specification.

Our invention relates to improvements in devices for detachably holding tires in place on automobile wheels.

The object of our invention is to provide a more simple and efficient device, than has heretofore been made, for fastening tires upon and detaching them from automobile wheels, whereby the labor of removing and replacing tires is greatly reduced.

Our invention is further explained by reference to the accompanying drawings in which—

Figure 1 represents a side view of an ordinary automobile wheel provided with our tire retaining device. Fig. 2 is a longitudinal section through a portion of the wheel felly and tire showing one of the tire retaining devices. Fig. 3 is a transverse section drawn on line $x$—$x$ of Fig. 1, and Fig. 4 is a transverse section drawn on line $y$—$y$ of Fig. 1.

Like parts are identified by the same reference numerals throughout the several views.

The wheel 1 and tire 2 are substantially of ordinary construction. The invention herein is predicated more especially, as suggested, upon the mechanism for detachably securing the tire in place upon the wheel.

The tire 2 is provided upon the respective sides of its base with annular beads 3, 3 for the reception of the retaining flanges 4, 4. The flanges 4 are each connected or formed integrally with the annular rim 5. The flanges 4 and rim 5, when in place upon the tire, serve to retain the overlapping edges 6 and 7 of such tire together, as shown in Figs. 3 and 4. The flanges 4 and rim 5 are adapted to be removed from and replaced upon the wheel together with the tire.

8 is an ordinary wooden felly of a wheel and is supported from the hub 9 by a plurality of spokes 10 in the ordinary manner. Surrounding the periphery of the felly 8 is an annular metallic rim 11. The rim 11 is held firmly against the periphery 8 by a plurality of thimbles 12. The thimbles 12 are each provided at their outer diverging ends with an annular flange 13 which flange bears against the periphery of the annular rim 11. Each of the threaded thimbles 12 are provided with a screw 14 which has threaded bearings in said thimbles. The outer ends of the screws 14 are adapted to bear against the inner surface of the angular projections or shoulders 30. Thus it is obvious that as the screw 14 is turned forward in the threaded bearings of the thimble 12 against the shoulders 30, said thimble 12, together with the flanges 13, will be drawn inwardly by said screw, whereby the annular flanges 13 are caused to bear against the opposing surface of the rim 11.

15 is an annular bracket which is adapted to bear against the inner surface of the felly 8 and against the respective sides of said felly, rim 11 and shoulders 30. A spiral spring 18 is interposed between the inner surface of the felly 8 and the inclosing brackets 15.

19 19 19 are nuts which have threaded bearings on the screws 14 and said nuts are adapted as they are turned down on said screws 14 against the brackets 15 to force said brackets 15 past the opposite sides of the shoulders 30, whereby said annular rim and the tire connected therewith are securely retained in place upon the wheel. When it is desirous to remove the tire from the wheel the operator has simply to turn back the several nuts 19 on said screws 14 when the brackets 15 will be forced inwardly by the recoil of said spiral spring 18 until the outer edges 20, 20 of said brackets are moved past the opposing side of the shoulders 30, whereby the tire and annular rim connected therewith can be readily removed from the wheel, while the bracket 15, together with the rim 11, is retained in place upon the felly.

When a tire has been placed upon a wheel in the position shown the screws 14 are first turned down in the thimbles 12 until the inner ends of said screws are brought within the V shaped groove 21. When this is done the nuts 19 are turned down on said screws 14 until the bracket 15 is forced outwardly past the respective sides of the shoulder 30, as shown in Figs. 3 and 4, whereby the tire and its retaining rim are securely retained upon the felly and cannot be disengaged therefrom until said nuts 19 have been again turned back upon said screw 14.

By the device shown in Fig. 4 a tubular member 23 is substituted for the screw 14 and an aperture is provided for said tubular member through the felly 8, rims 5 and 11 and shoulder 30, as shown in said figure. The exterior surface of said tubular member 23 is also provided with a nut 19' which has threaded bearings on the periphery of said tubular member and said nut is adapted to be turned down on said tubular member against the opposing surface of the bracket 15'. The bracket 15', which is used in connection with the tubular member 23, is preferably provided with a plurality of slots 24, 24 for the reception of the bolts 17, whereby it is obvious that when the nuts 26 have been turned back on said bolts 17 and said nut 19' has been turned back on said tubular member 23, the bracket 15' and plate 16 may be readily moved out of contact with the shoulder 30 preparatory to removing the tire from the wheel. Said bracket 15', plate 16 and clamping bolts 17 are adapted to be used with the tubular member 23 only. The plate 16 is adapted to bear against the opposite sides of said felly and rims from the bracket 15' and said plate 16 and bracket 15' are retained in place upon the respective sides of said felly and rims by the clamping bolts 17.

27 is a thimble of ordinary construction which is adapted to be turned down over the inner end of the tubular member 23, whereby the aperture 28 in said tubular member is closed.

A groove or channel 29 is cut in the felly 8 and rim 11 upon the right hand side of the tubular member 23 corresponding in width with the diameter of such tubular member, reference being had to Fig. 4. When desirous to remove the tire the thimble 27 and nut 19' are first removed from the tubular member 23 when the nuts 26 are turned back on the bolts 17, thereby permitting the bracket 15' to be removed. When this is done the tubular member 23, together with the tire 2 and rim 5, is free to be disengaged from the felly.

To prevent the rim from creeping or moving in a circular direction upon the supporting felly, we have provided the tire inclosing rim 5 with a plurality of angular projections 30 and we have provided the felly inclosing rim 11 with a plurality of recesses 31 for the reception of said angular projections, as shown in Fig. 1, it being understood that when the tire is in place the projections 30 will enter the recesses 31 and prevent the rim from creeping or moving in a circular course around the felly.

Having thus described our invention what we claim as new and desire to secure by Letters Patent is—

1. In a device of the described class, the combination with a wheel felly of a plurality of brackets, each bracket being adapted to inclose a portion of the inner surface of said felly, a screw threaded member located in an aperture, provided therefor in said brackets, a wheel tire, a tire carrying rim secured to the inner surface of said tire, a shoulder formed on said tire carrying rim, a nut having threaded bearings on said screw threaded member, said nut being adapted to be turned forward on said screw threaded member against said bracket, whereby said bracket is forced outward and caused to engage the opposite sides of said shoulder, said member extending through said felly, tire carrying rim and tire, a plate adapted to bear against the opposite sides of said felly and tire carrying rim from the opposite side of said angular bracket, bolts for securing said plate to said felly and angular bracket, a nut carried by said threaded member adapted to bear against said angular brackets and a sleeve having threaded bearings on one of said members and adapted to bear against the inner side of said nut, all substantially as and for the purpose specified.

2. In a device of the described class, the combination with a wheel felly, of a plurality of brackets, each bracket being adapted to inclose a portion of the inner surface of said felly, a screw threaded tubular member located in an aperture, provided therefor in one of said brackets, a wheel tire, a tire carrying rim secured to the inner surface of said tire, a shoulder formed on said tire carrying rim, a nut having threaded bearings on said screw threaded tubular member, said nut being adapted to be turned forward on said screw threaded tubular member against said bracket, whereby said bracket is forced outward and caused to engage the opposite sides of said shoulder, said tubular member extending through said felly, tire carrying rim and tire, a plate adapted to bear against the opposite sides of said felly and tire carrying rim from the opposite side of said angular bracket, bolts for securing said plate to said felly and angular bracket, a nut carried by said tubular member adapted to bear against one of the members of said angular bracket and a sleeve having threaded bearings on said tubular member and adapted to bear against the inner side of said nut, all substantially as and for the purpose specified.

In testimony whereof we affix our signatures in the presence of two witnesses.

MEYER ROSENHEIMER.
MEYER HUGO ROSENHEIMER.

Witnesses:
JAS. B. ERWIN,
IRMA D. BREMER.